United States Patent [19]

Fusiek

[11] 3,914,490
[45] Oct. 21, 1975

[54] CERAMIC FIBER GASKET
[75] Inventor: Michael P. Fusiek, Cicero, Ill.
[73] Assignee: Dana Corporation, Toledo, Ohio
[22] Filed: Aug. 1, 1973
[21] Appl. No.: 384,594

[52] U.S. Cl. ............... 428/133; 161/50; 161/156; 161/158; 161/207; 161/225; 277/235 R
[51] Int. Cl. ............. B32b 3/24; B32b 15/14
[58] Field of Search ............. 161/50–52, 161/109, 111, 165, 225, 207, 205, 218, 151, 155, 156, 158; 277/235 B, 235 R, 236, 234

[56] References Cited
UNITED STATES PATENTS

| | | | |
|---|---|---|---|
| 1,776,140 | 9/1930 | Balfe | 161/111 |
| 1,911,484 | 5/1933 | Victor | 161/111 |
| 1,968,365 | 7/1934 | Bailey | 161/111 |
| 2,054,869 | 9/1936 | Smolak | 161/205 |
| 2,072,863 | 3/1937 | Balfe | 277/234 |
| 2,977,265 | 3/1961 | Forsberg et al. | 161/50 X |

Primary Examiner—Harold Ansher

[57] ABSTRACT

A gasket is made by applying a mixture including ceramic fibers, inert clay and water to the top and bottom surfaces of a double sided perforated metal core. The surfaces are smoothed and dried. The assembly is subsequently calendered to a predetermined thickness and individual gaskets are then cut from the assembly.

8 Claims, 5 Drawing Figures

U.S. Patent   Oct. 21, 1975   3,914,490
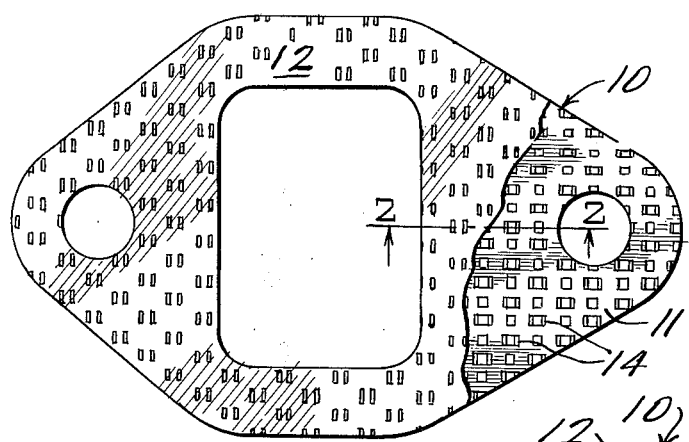
FIG-1-
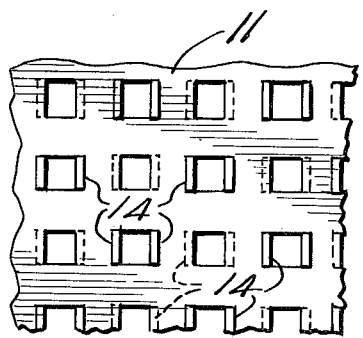
FIG-3-
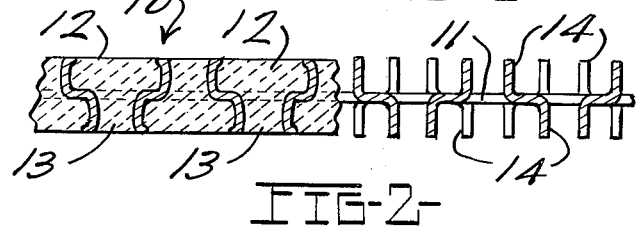
FIG-2-
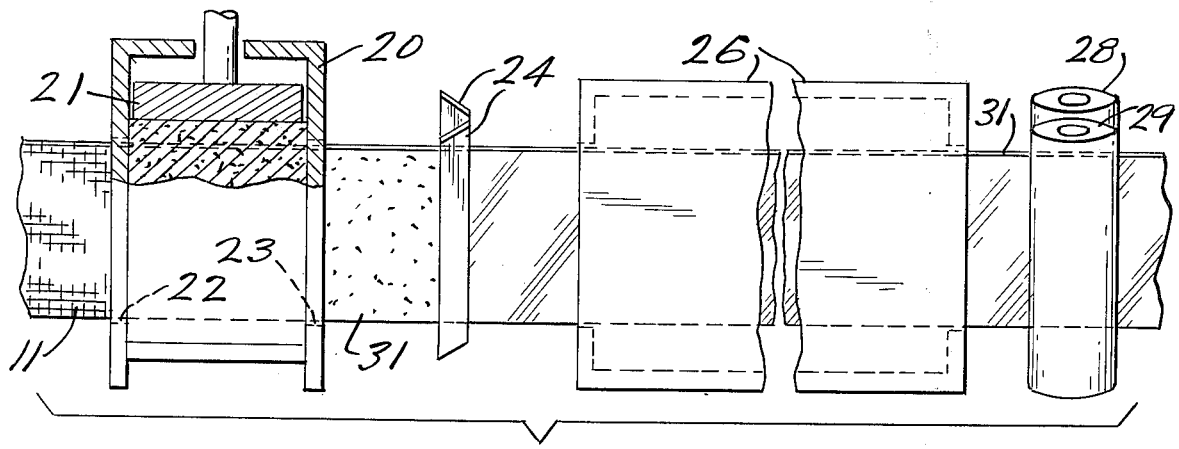
FIG-4-
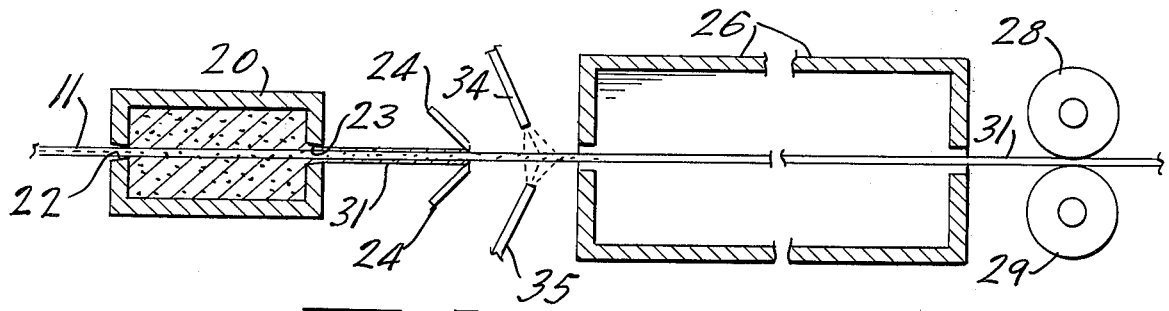
FIG-5-

CERAMIC FIBER GASKET

BACKGROUND OF THE INVENTION

Layered gaskets are known in the art. For example, Balfe U.S. Pat. No. 1,927,450, which issued Sept. 19, 1933, discloses a layered gasket having a metal core surrounded by two outer layers of packing material such as a composition asbestos.

Prior art gaskets made from asbestos compositions begin to disintegrate between 900° and 1000°F., with a maximum temperature limit of approximately 1100°F. In modern applications, for example in exhaust systems for internal combustion engines which include emission control catalytic converters and reactors, the temperatures often exceed the 1100°F. temperature range and many prior art gaskets cannot survive.

SUMMARY OF THE INVENTION

The present invention relates to a ceramic fiber gasket and the method of making such a gasket. The ceramic fiber gasket, according to the present invention, is suitable for high-temperature applications in the order of 1800°F. It has been found that gaskets, according to the present invention, can stand intermittent temperatures up to a 2200°–2300°F. temperature range.

The present high-temperature gasket comprises a perforated metal core having a ceramic fiber layer attached to each of the opposed sides of the core.

The present gasket is made by moving a sheet of perforated metal along a predetermined path; applying a heat-resistant dough-like material, including aluminum-silicate fibers and inert clay, to the sides of the perforated metal core; smoothing the surfaces of the layered assembly which has been formed; drying the layered assembly to substantially reduce the moisture content; compressing the layered assembly to a predetermined thickness; and forming individual gaskets from the layered assembly.

BRIEF DESCRIPTION OF THE DRAWINGS

FIG. 1 is a fragmentary view showing a layered ceramic fiber gasket, according to the present invention, with a portion of the outer layer removed to show the metallic core;

FIG. 2 is a vertical, cross-sectional view, taken along the line 2—2 of FIG. 1 and shown on an enlarged scale and showing a portion of the core prongs in a clinched position;

FIG. 3 is a fragmentary plan view of the perforated metal core;

FIG. 4 is a diagrammatic side elevational view showing various method steps, according to the present invention; and FIG. 5 is a diagrammatic plan view similar to FIG. 4.

DESCRIPTION OF THE PREFERRED EMBODIMENTS

A gasket according to the present invention is generally indicated in FIG. 1 by the reference number 10. The gasket 10 includes a perforated metal core 11 and opposed layers 12 and 13 of insulating material. The insulating material comprises a kaolin ceramic fiber and an inert hard clay mineral filler. The kaolin ceramic fiber is an alumina-silica ceramic fiber having a fiber diameter of approximately 2.8 microns and an average length of approximately one inch. One form of these alumina-silica fibers are, for example, sold by Babock & Wilcox under the trademark "KAOWOOL".

The inert clay mineral filler is, for example, a clay composition which consists principally of aluminum oxide and silicon dioxide. This particular inert clay filler has the following physical properties:

| | |
|---|---|
| Screen Fineness: | 99.5% min. through 325 mesh |
| Color: | Light cream |
| Specific Gravity: | 2.60 typical |
| Moisture Content | 1% max. |
| Oil Absorption: | 28–36 g. linseed oil per 100 g. clay |
| pH: | 4.8–6.5 |
| Loss on Ignition: | 13.5–14.5% |

It will be appreciated that the inert clay filler as described above performs a physical rather than a chemical function, and that substantially equivalent results can be achieved when a similar filler is substituted for the aluminum oxide-silicon dioxide filler. For example, the filler should be substantially insoluble in water and be inert with regard to the compounding ingredients. Particulate fillers such as bentonite, kaolin clays, including kaolinite, and halloysite, montmorillonite clays including montmorillonite, nontronite and mica clay minerals can be used effectively. Furthermore, mixtures of the above materials, having the desired particle sizing, oil-absorptive properties and moisture content, can be used.

The perforated metal core 11 is preferably, but not limited to, a stainless steel core, of 0.006 inch thickness, which is temperature-resistant. For example, it has been found that various 400 series or 300 series stainless steel provides satisfactory temperature resistant characteristics. In the present embodiment, the metal core 11 is constructed of Type 430 stainless steel having a scaling temperature between 1900°–2050°F. However, other types of metallic cores of various alloys may be utilized, for examples, Monel cores, Inconel cores and Nichrome cores.

Referring to FIGS. 2 and 3, the perforated metal core 11 has a plurality of core prongs 14. As shown on the left side of FIG. 2, the prongs 14 are clinched during the production of the gaskets 10 and serve as a mechanical means of attaching the layers 12 and 13 to the core 11. The layers 12 and 13 are also attached to the core 11 by binder means as discussed below.

Other types or configurations of metallic cores may be utilized, for example, a metallic core having the configuration shown in U.S. Pat. No. 2,753,199 may be utilized.

In making a plurality of gaskets 10, raw materials are initially charged in a mechanical mixer. A typical charge of material is shown below:

| EXAMPLE A | TOTAL BY WEIGHT - PERCENTAGE |
|---|---|
| Aluminum-Silicate Ceramic Fibers | 17.08 |
| Inert Clay | 30.76 |
| Polyvinyl Acetate Emulsion | 5.13 |
| Portland Cement | 3.42 |
| Aquablack B | 0.75 |
| Water | 42.86 |
| | 100.00% |

The polyvinyl acetate emulsion is utilized as a "green" binder for the ceramic fibers. The polyvinyl acetate gives good quick strength to the mixture, however, it has been found that other green binders such as polyvinyl chloride or neoprene compositions may be utilized in the present method.

The Portland cement serves as a binder for the entire gasket assembly 10 and aids in attaching the layers 12 and 13 to the core 11.

Though color is no factor in the performance of the final gasket, the addition of a color pigment does contribute to a more consistent appearance. In the above formulation, Aquablack B, which is a carbon black dispersion, is used as the coloring agent. Other types of coloring agents which may be utilized are various iron oxide dispersions for red and yellow shades, chrome oxide for green, and graphite for black.

After mixing has been completed in the above-mentioned mechanical mixer, the batch material is charged into a container 20 having a hydraulically operated ram 21 positioned adjacent its upper end. An inlet slot 22 and an outlet slot 23 (see FIG. 5) are provided in the opposed sidewalls of the container 20 and receive a longitudinally extending strip of the perforated metal core 11 which travels along a predetermined path. The metallic core strip is pulled along its path on a conveyor (not shown) at a predetermined rate of speed, for example, 15 feet per minute. A pair of doctor blades 24 are positioned on opposite sides of the core 11 adjacent the outlet slot 23. A drying oven 26 is provided downstream and the dough-filled metal core strip 11 is moved along its predetermined path by the conveying mechanism. A pair of calendering rolls 28 and 29 are located on the discharge side of the drying oven 26.

After the container 20 has been charged with the mixed batch material, the ram 21 is actuated and the batch material is forced, under pressure, against the opposed sides of the perforated metal core 11 to form a layered assembly generally indicated by the reference number 31. The batch material has a dough-like consistency which adheres, under pressure, to the perforated metal core 11. It has been found that a pressure of between 5 and 25 psi supplies satisfactory force to adhere the Example A batch material to the core 11. While in the present embodiment, the batch material is applied to both sides simultaneously, in an alternative method the batch material may be applied to one side at a time or to only the prong side of a single sided perforated metal core.

After the layered assembly 31 leaves the container 20 through the outlet slot 23, it passes through the angularly displaced doctor blades 24. The doctor blades 24 smooth the surfaces of the layered assembly 31. At this time, the layered assembly has a thickness of 0.085–0.090 inch, while the unclinched perforated metal core 11 has a 0.080–0.085 inch prong height. The assembly 31 then passes through the drying oven 26 which is operated at an oven temperature of between 200°–300°F. Upon discharge from the drying oven 26, the layered assembly 31 has a moisture content of approximately 5%. Next, the layered assembly 31 passes between the calendering rolls 28 and 29. The rolls 28 and 29 increase the density of the layered assembly 31 and at the same time tends to eliminate any air voids within the material. While passing through the rolls 28 and 29, the layered assembly 31 is calendered to a final gauge of between 0.050 inch and 0.055 inch. At the same time, the prongs 14 of the perforated metal core 11 are folded over to clinch the layers 12 and 13 forming the above-mentioned mechanical bond. Normally, after the calendering step, the layered assembly 31 is stored for a period of time in order to allow the Portland cement binder to complete its hydrolyzation. The last step is to stamp, for example, by the use of steel dies, the layered assembly 31 into a plurality of gaskets 10. The completed ceramic fiber gaskets 10 have a nominal thickness of 0.050–0.055 inch.

In an alternative method, nozzles 34 and 35 are provided before the entrance to the drying oven 26. After passing between the doctor blades 24 and 25, the layered assembly 31 is sprayed with a binder, for example, a polyvinyl acetate emulsion. It has been found that in some instances this spraying step tends to eliminate flaking along the surfaces of the layered assembly 31.

It has been found that the present method results in a gasket 11 which has both the physical and temperature properties suitable for high-temperature applications.

What I claim is:

1. A gasket comprising a metal core including perforations defining prongs extending from both sides thereof and a ceramic fiber layer attached to both sides of said core, said layer comprising a mixture of ceramic fibers, an inert and substantially water insoluble filler, Portland cement and a green binder selected from the class consisting of polyvinyl acetate, polyvinyl chloride and neoprene.

2. The gasket of claim 1 wherein said ceramic fibers are alumina-silica.

3. The gasket of claim 1 wherein said fibers have a fiber diameter of about 2.8 microns and an average length of 1 inch.

4. The gasket of claim 3 wherein said ceramic fibers are alumina-silica.

5. The gasket of claim 1 wherein said ceramic fiber layers are attached to said perforated metal core by bending the ends of said core prongs to clinch said layers to said core.

6. The gasket of claim 5 wherein said ceramic fibers are alumina-silica.

7. The gasket of claim 6 wherein said green binder is polyvinyl acetate.

8. The gasket of claim 7 wherein said fibers have a diameter of about 2.8 microns and an average length of 1 inch.

* * * * *